2 Sheets—Sheet 1.

W. BECK.
Glass-Press.

No. 162,791. Patented May 4, 1875.

Witnesses
R. S. Campbell
J. N. Campbell

Inventor
Washington Beck
by his attys
Mason Fenwick

W. BECK.
Glass-Press.
No. 162,791.
2 Sheets--Sheet 2.
Patented May 4, 1875.
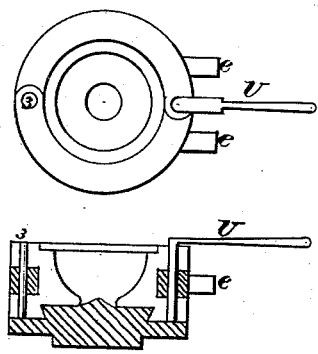
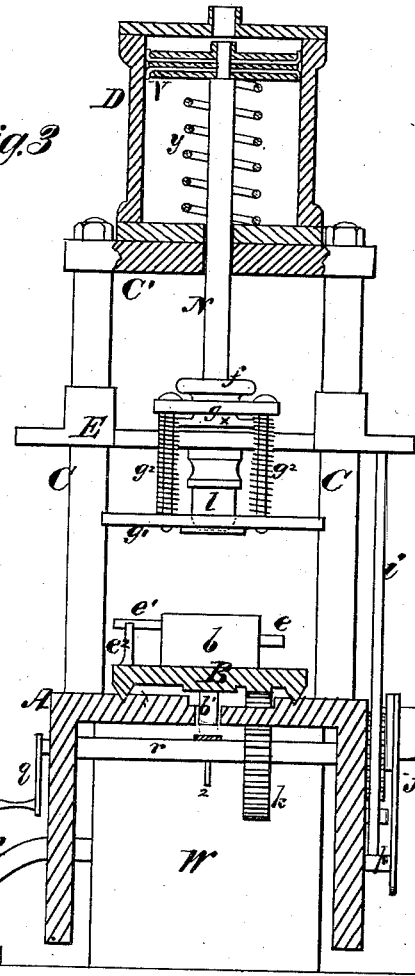
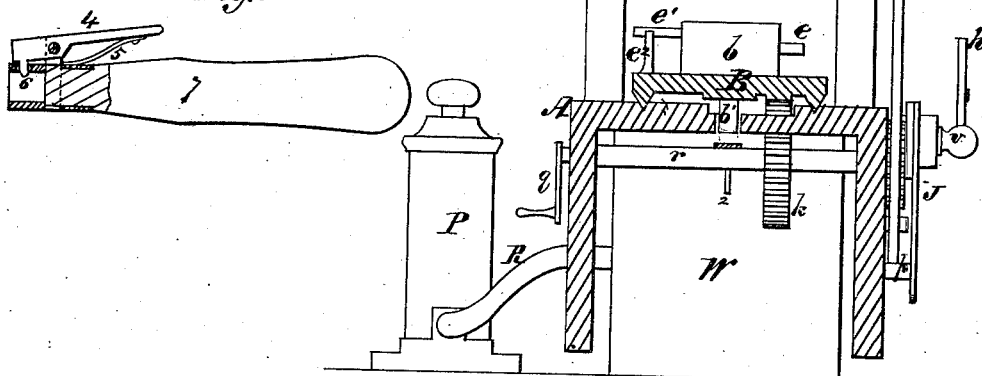
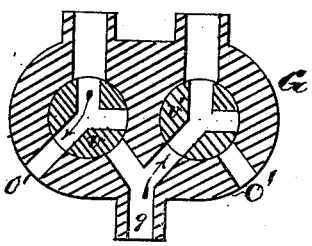
Witnesses:
R. T. Campbell
J. N. Campbell
Inventor
Washington Beck
by his Attys
Mason Fenwick & Lawrence

UNITED STATES PATENT OFFICE.

WASHINGTON BECK, OF PITTSBURG, PENNSYLVANIA.

IMPROVEMENT IN GLASS-PRESSES.

Specification forming part of Letters Patent No. 162,791, dated May 4, 1875; application filed April 4, 1873.

*To all whom it may concern:*

Be it known that I, WASHINGTON BECK, formerly of Birmingham, in the county of Allegheny, State of Pennsylvania, but now residing in Pittsburg, in the county of Allegheny and State of Pennsylvania, have invented a Power-Press for the Manufacture of Glassware; and I do hereby declare that the following is a full, clear, and exact description thereof, reference being had to the accompanying drawings making part of this specification, in which—

Figure 1:
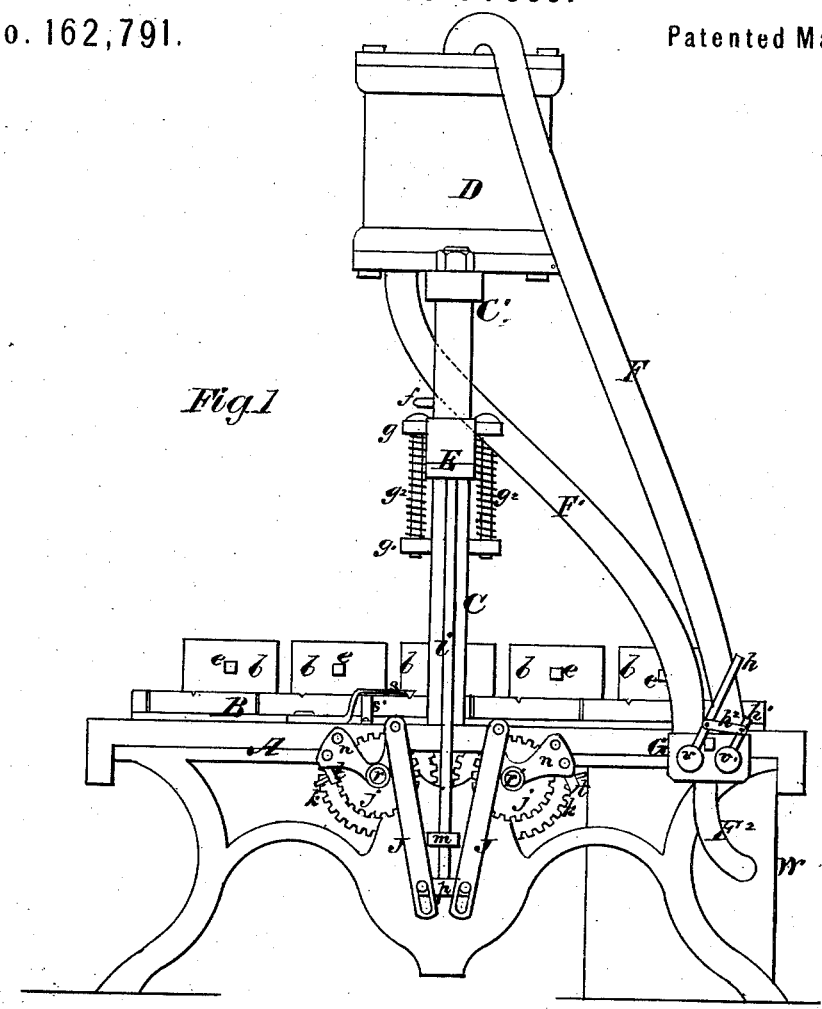
Figure 2:
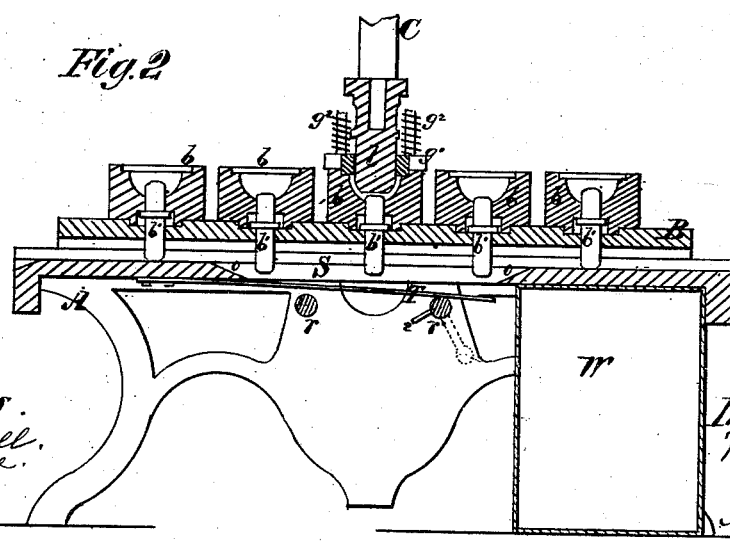

Figure 1, Plate 1, is an elevation of one side of the press. Fig. 2, Plate 1, is a section, taken vertically and longitudinally through the center of the press, the piston and its cylinder being removed. Fig. 3, Plate 2, is a section taken vertically and transversely through the press. Figs. 4, Plate 2, show an open and shut mold. Fig. 5, Plate 2, is a sectional view of a lifting-handle for the molds. Fig. 6, Plate 2, is a sectional view of the valve-box, through which air is alternately introduced above and below the piston.

Similar letters of reference indicate corresponding parts in the several figures.

The object of my invention is to render practical power-presses for the manufacture of pressed glassware, by the employment of atmospheric pressure in combination with a movable plunger and glass molds, as I will hereinafter explain.

Prior to my invention attempts have been made to work molding-presses by steam-power, but owing to the accumulation of water of condensation in the steam-pipes and other passages the movements imparted to the pressing-head or plunger were irregular, or too quick at one time and too slow at other times. The result of such movements was to injure the molds and produce imperfect work. Another objection attending the use of steam is its condensation in the steam-cylinder and escape of water therefrom upon the molds below it.

It will be seen from the following description that the above objections are remedied by the employment of atmospheric pressure, which is regular in its action, and can be perfectly controlled by an attendant. At the same time there will be no moisture generated which would be liable to injure the work.

The following is a description of one practical mode of carrying my invention into effect: On a table, A, is a reciprocating mold-bed, B, which is moved by means of spur-wheels $k\ k$ and transverse shafts $r\ r'$. On the outer ends of the shafts $r\ r'$ are spur-wheels $j\ j$ and vibrating pawl-arms $n\ n$, carrying pawls $t\ t$. The wheels $j\ j$ are keyed on their shafts, but the pawl-arms are applied loosely thereon, and vibrated by means of connecting-rods J J, a rod, $i$, and a vertically-reciprocating cross-head, E. The rod $i$ passes through a fixed guide, $m$, and is connected to a block, $p$, which latter is connected to the rods J J, by means of pins working in oblong slots made through the lower ends of these rods. The oblong slots just referred to allow the plunger $l$ and spring-plate $g^1$ to rise clear of the molds before the mold-bed commences to move. Only one pawl, $t$, is in operation at a time, and these pawls should be adjusted at the termination of each full stroke of the bed. For the purpose of positively holding the mold-bed stationary during each operation of pressing, I employ one or more spring-clicks, $s\ s'$, which engage with notches made into the bed.

I have represented five molds, $b\ b\ b\ b\ b$, upon the bed B, arranged so as to be successively brought beneath the plunger $l$ by the intermittent movements imparted to the bed, as above described. This number may be increased, or only a single mold may be employed, in which latter case the mold-bed may be stationary, or such mold may be applied directly upon the table A. The cross-head E is guided in its vertical movements by means of standards C C, which are connected together at their upper ends by means of a head-bar, C', on which is secured a cylinder, D, having a piston, V, working in it, said piston moving downward against a light spring, Y, which acts as an easing-cushion, and assists the piston in its ascent. The piston-rod N, works air-tight through the lower head of the cylinder D and below the cross-bar C'. This rod is screw-threaded and receives upon it a hand-wheel, $f$, jam nut $x$, and the plunger $l$. The wheel $f$ and nut $x$ are for the purpose of adjustably securing a plate, $g$, to the piston-rod, which plate is connected to the spring-plate $g^1$ by four rods, surrounding which are springs $g^2$. The lower ends of said rods are fixed to the spring-plate, but their upper headed ends pass loosely through the plate $g$. This allows the plunger to continue its descent into the molds after the spring-plate has been brought down thereupon. The hand-wheel $f$ and jam-nut $x$ allow the spring-plate, with its suspension-plate $g$, to be adjusted up or down on the piston-rod, according to the different heights of molds. The cylinder D has a pipe, F, communicating with its upper end, and a pipe, F', communicating with its lower end. These pipes are coupled to a valve-box, G, in which are two valves, $v$ $v^1$, having V-shaped passages through them, and handles $h$ $h^1$ applied to their exposed stems. The handles last referred to are connected together by a link, $h^2$. The valve-box is constructed with a passage, 9, which communicates with a reservoir, W, by means of a pipe, $F^2$, and also with two passages which communicate with the cylinder D above and below the piston V. This valve-box is also constructed with exhaust-passages $o'$ $o'$. When the three-way valves $v$ $v^2$ are adjusted as shown in Fig. 6 air from passage 9 will pass through valve $v^1$ to the space above the piston and depress the piston. At the same time air from beneath the piston will be expelled through valve $v$ and exhaust-passage O on the left-hand side of the valve-box.

When the valves are reversed air will pass to the space below the piston through valve $v$, and exhaust through valve $v^1$ and the right-hand passage $o^1$. These valves are moved by an attendant, and, by means of them, he has complete control of the power which moves the piston, both for depressing the plunger and raising it.

It is important to have a reservoir, W, of such capacity as will contain at least a sufficient volume of air to give two strokes to the plunger, which reservoir will be supplied by means of an air-engine, P, or its equivalent, worked by any convenient power.

Instead of using condensed air for actuating the press, atmospheric pressure may be employed, by alternately creating a vacuum above and below the piston V. I prefer, however, to use condensed air, as in this case any desired degree of pressure may be obtained.

For the purpose of automatically discharging the pressed articles from the molds, these molds are provided with movable plugs $b'$, working centrally through their bottoms, which plugs drop down into a slot, S, made through the table-top A as they approach the plunger $l$; and, after the operation of pressing, the plugs $b'$ are raised by inclined planes $o$ at the termini of said slot. The articles are thus loosened in the mold, and can be removed by means of forks in the hands of boys.

For the purpose of handling the molds I employ a handle, 7, having a prismatic socket in its end, and provided with a catch-pin, 6, on a spring key, 4. On the molds I secure prismatic tenons $e$, one or more, which are received into the socket in the handle 7, and secured therein by the pin 6 entering a notch or depression in such tenon.

If it is desired to tilt the molds at any time for the purpose of discharging from them any foreign matter, this can be conveniently done, after applying the handle 7 to them, by means of the standard $e^2$ and a rod, $e^1$, which afford fulcrum-supports for one side of the molds, and allow them to be upset.

The open and shut mold shown by Figs. 4, which does not require the movable discharging-plug, consists of three main parts, two of which are hinged together, and held shut by a handle-pin, V. The circular dovetail elevation on the top of the bottom plate of this mold is received into corresponding recesses formed in the bottom of the hinged halves. This open and shut mold is, like the solid molds, constructed with circular tenon on its bottom, which is received into a corresponding recess made into the bed B, thus preventing lateral displacement of the mold when applied on its bed.

In using a rectilinear movable bed, B, and a slot, S, with the inclined planes $o$ $o$, an auxiliary lifting device, T, is employed to remove the article from the mold. This device consists of a strip, T, secured at one end beneath the table-top, and left free at the other end. The free end of this strip is raised by means of a pin, 2, on the shaft $r^1$, and at proper times the free end of the strip T will be raised, and act against a discharging-plug, $b'$, next to the last molds of the series. Two lifting-strips T are required, arranged for lifting the plugs $b'$, which are next both ends of the series.

Lifting-strips similar to those above described may be used without the inclined planes, but in such case more pins must be applied to the shaft $r$.

The bed of molds may be run out either to the right or left by turning the shaft $r$ with the handle $q$. This is quite important for arranging the molds.

I have found for light work that a vacuum apparatus for producing the pressing operation will be useful; but I prefer the compressed-air apparatus, as a more powerful pressure with a smaller cylinder may be obtained.

Having described my invention, what I claim as new, and desire to secure by Letters Patent, is—

1. The power glass-press, consisting of the glass-shaping mechanism, and the mechanism for applying atmospheric pressure for performing the pressing operation, combined and operating substantially as described.

2. The combination of the revolving shaft $r$, carrying pin 2, with the plugs $b'$ of molds $b$, substantially in the manner and for the purpose described.

3. The incline planes $o$ of table A, in combination with the lifting-plugs $b'$, substantially as described.

4. The spring T, in combination with the reciprocating mold-bed B, plugs $b'$, and shaft $r$, carrying pin 2, substantially as described.

5. The combination of the shaft $r$, wheel $k$, handle $q$, and the automatically-reciprocating mold-bed B, in the manner and for the purpose described.

6. The combination of the mold-bed B, connecting-links J, a rod, $i$, wheels $j$ and $k$, pawls $t$, and a plunger, $l$, substantially as and for the purpose described.

7. The locking device $s$ or $s'$, in combination with the bed of molds, substantially as described.

8. The removable handle 7, constructed with a socket, and provided with a catch pin, 6, on a spring-key, 4, and adapted to be fitted and fastened upon the tenon $e$ of the molds, substantially as and for the purpose described.

WASHINGTON BECK.

Witnesses:
  J. N. CAMPBELL,
  CHAS. P. WEBSTER.